Patented May 8, 1923.

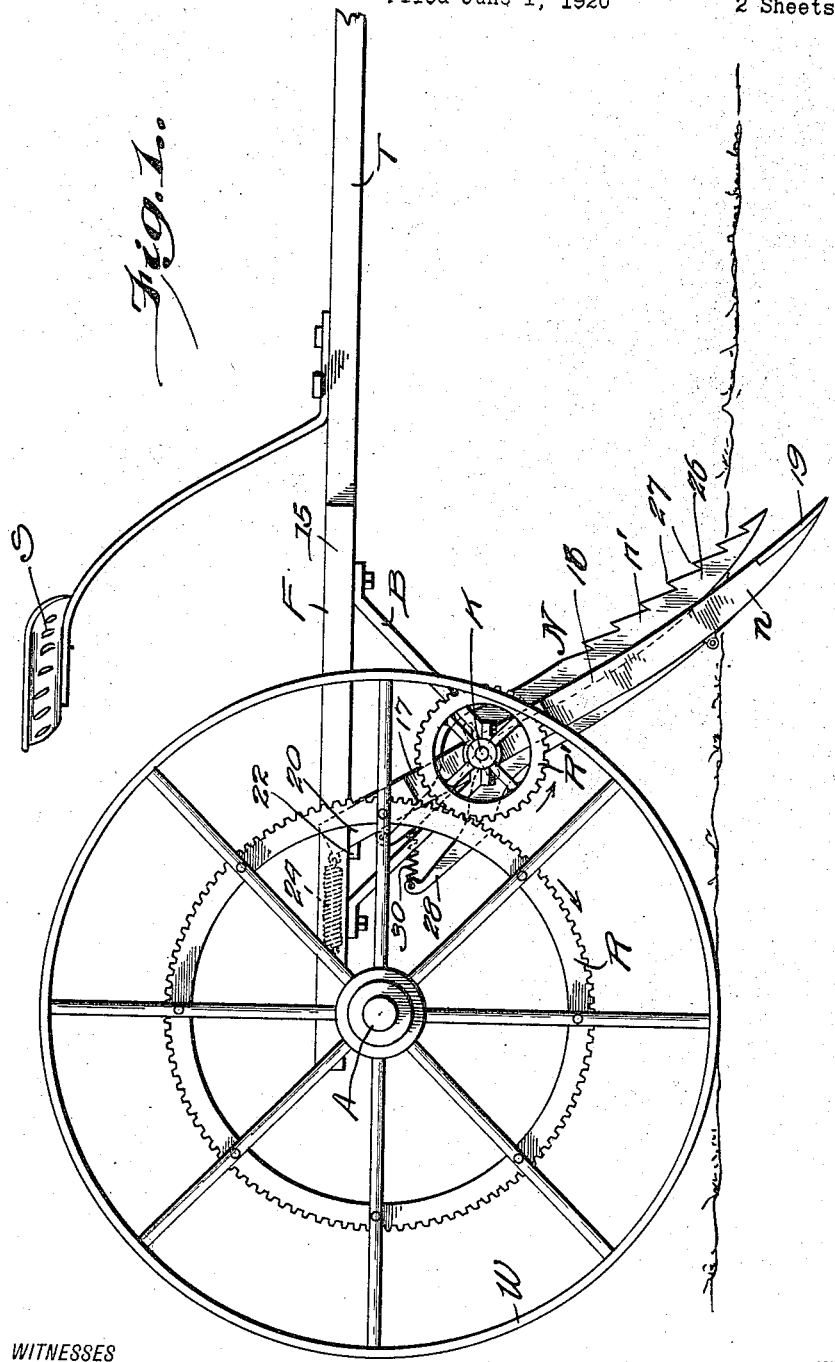

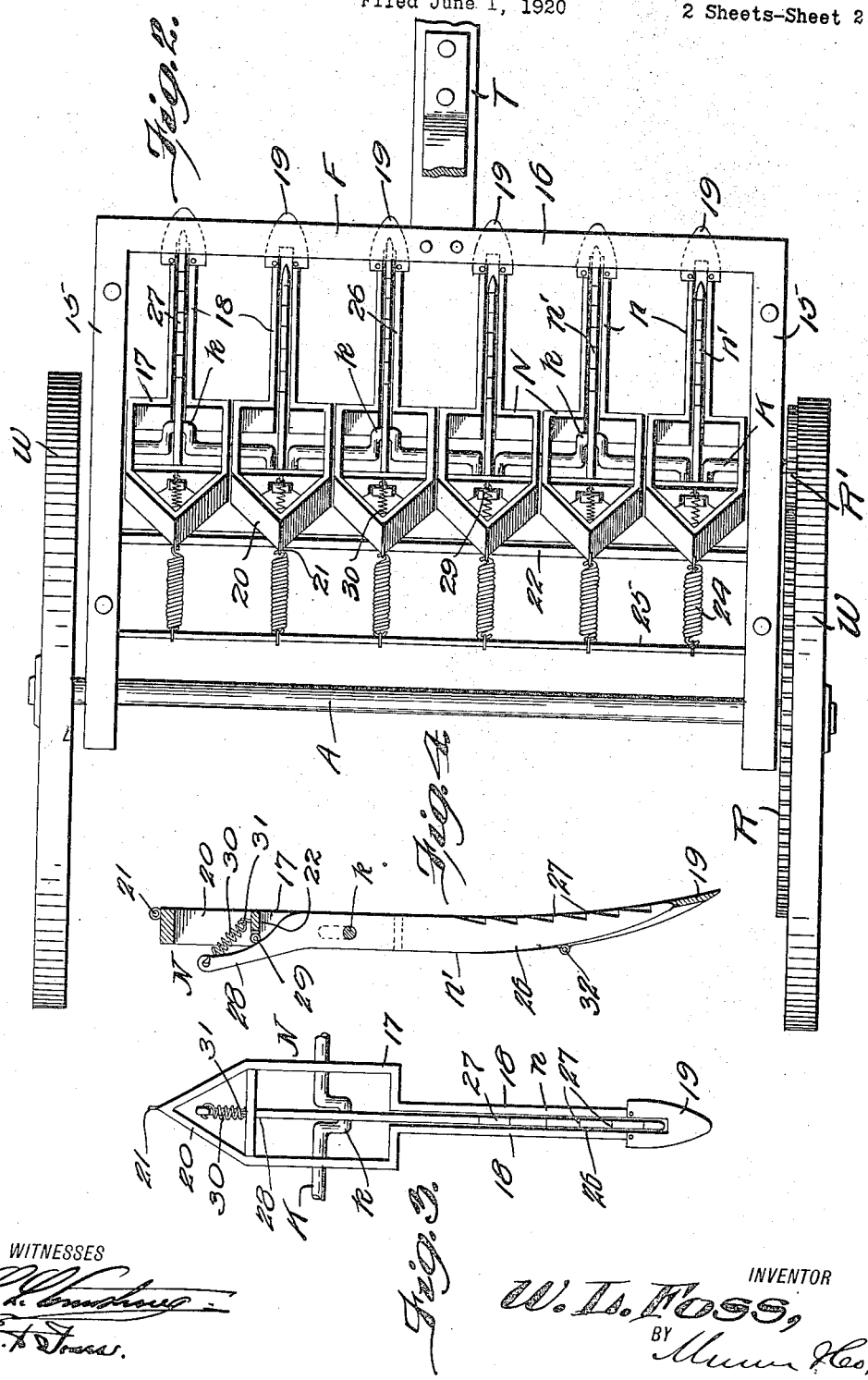

1,454,580

UNITED STATES PATENT OFFICE.

WALTER LEVI FOSS, OF WINDOM, MINNESOTA.

GRASS-DIGGING IMPLEMENT.

Application filed June 1, 1920. Serial No. 385,553.

*To all whom it may concern:*

Be it known that I, WALTER LEVI FOSS, a citizen of the United States, and a resident of Windom, in the county of Cottonwood and State of Minnesota, have invented certain new and useful Improvements in Grass-Digging Implements, of which the following is a specification.

My invention relates to implements for removing quack grass from the soil, and a purpose of my invention is the provision of an implement of this character of simple and efficient construction which when drawn over a field automatically effects the complete removal of quack grass from the soil.

I will describe one form of implement embodying my invention and will then point out the novel features thereof in claims.

In the accompanying drawings:

Figure 1 is a view showing in side elevation one form of implement embodying my invention.

Figure 2 is a top plan view of the implement shown in Figure 1.

Figure 3 is an enlarged detail view of one of the digging and ejecting units comprised in the implement shown in Figures 1 and 2.

Figure 4 is a vertical sectional view of the unit shown in Figure 3.

Similar reference characters refer to similar parts in each of the several views.

Referring specifically to the drawings and particularly to Figures 1 and 2, A designates an axle upon the opposite ends of which are journaled the wheels W. Secured in any suitable manner to the axle A at a point adjacent its opposite ends are the free ends of the parallel portions 15 of a U-shaped frame F. The frame F also includes a portion 16 connected to the parallel portions 15 and to which is secured a tongue T having supported thereon an operator's seat S. Secured to and depending from the parallel portions 15 of the frame F are V-shaped brackets B in which is journaled a crank shaft K. As illustrated to advantage in Figure 2, the crank shaft K is provided at regular intervals with cranks $k$, any two adjacent cranks being reversely disposed for a purpose which will be hereinafter described. Mounted upon the crank shaft K are a plurality of digging and ejecting units, each unit being designated at N and comprising a digging member $n$ and an ejecting member $n'$. As illustrated to advantage in Figures 3 and 4, each digging member comprises a rectangular frame 17 which is pivotally mounted upon the crank shaft K in a manner to enclose one of the cranks $k$. The lower end of the frame 17 is provided with parallel extensions 18, and at their lower ends with a shoe 19. The shoe 19 constitutes the actual digging part of the digging member and is designed to move through the soil to effect a loosening of the rhizome as will be more fully described hereinafter. The upper end of the frame 17 is formed with a tapered projection 20 having an eye 21 formed at the apex thereof. The digging member is biased to an inclined position as shown in Figure 1 and into engagement with a positioning bar 22 by means of a coil contractile spring 24 which as shown in Figure 2 is connected at one of its ends to the eye 21 and at its opposite end to a rod 25 connected to and spanning the space between the parallel portions 15.

The ejecting member embodying my invention comprises a bar 26 pivotally mounted upon the corresponding crank $k$ at a point adjacent its upper end. The bar 26 is disposed between the parallel extensions 18 with its lower end projected into a suitable slot formed in the shoe 19. As illustrated to advantage in Figure 4, the bar 26 is curved at its lower end and is formed at its forward edge with a plurality of upwardly extending teeth 27. The upper end of the bar 26 is formed with an extension 28 so disposed that its forward edge engages a roller 29 journaled in the frame 17. The upper end of the extension 28 is connected to one end of a coiled contractile spring 30, the opposite end of the latter being connected to the frame 17 by means of a hook 31. This spring 30 serves to bias the bar 26 to a vertical position wherein it is disposed between and parallel to the extensions 18 in the manner shown in Figure 4. As shown in this same figure, a roller bearing 32 is carried by the extensions 18 in a manner to engage the rear edge of the bar 26 at a point adjacent its lower end.

As shown in Figures 1 and 2, the crank shaft K is adaptd to be driven by one of the wheels W and through the medium of a ring gear R secured to the inner side of the wheel and meshing with a relatively small ring gear R' fixed to the adjacent end of the crank shaft K. By this arrangement it will be seen that when the vehicle is drawn over a field, the gears R and R' are driven in the direction of the arrows in Figure 1 thereby effecting a driving of the crank shaft K in a counter-clockwise direction.

The operation of the implement is as follows: When the implement is drawn over a field by applying suitable draft means to the tongue T, rotation of the wheels W effects a rotation of the crank shaft K in a counter-clockwise direction, as has been previously described. In the normal position of the units N, the digging and ejecting members occupy inclined positions with relation to the vertical and have their lower ends disposed lower than the wheels W so that they penetrate the soil. It will therefore be seen that with the crank shaft rotating in a counter-clockwise direction, the rotating crank $k$ effects a forward and upward movement of the bars 26 when the cranks are moving upwardly, and a rearward and downward movement of the same when the cranks are moving downwardly. The upward movement of one bar 26 is against the tension of its corresponding spring 30, but during downward movement of the bar the spring assists the bar in such movement. While the bar 26 is moving upwardly, the teeth 27 serve to lift the rhizomes of the grass from the soil. It will be understood that the digging members serve to loosen the rhizomes from the soil and to thereby assist the ejecting members in effecting an ejection of the rhizomes from the soil so that they can subsequently be collected and removed from the field by any standard form of rake. It is to be particularly noted that because of the disposition of the several cranks $k$ any two adjacent ejecting members $n'$ operate successively so that it may be said that one set of ejecting members is active to effect an ejection of the rhizomes from the soil, while the other set is inactive. This obviously causes the continuous ejection of the rhizomes from the soil as the implement moves over a field.

The digging members $n$, as has been previously described, are biased to the inclined position by means of springs 24, the purpose of this arrangement being to allow of the rearward movement of the lower end of the members when they encounter impassable obstacles so as to allow of the passage of the members over the obstacles without any detrimental action to the same.

Although I have herein shown and described only one form of implement embodying my invention, it is to be understood that various changes and modifications may be made herein without departing from the spirit of the invention and the spirit and scope of the appended claims.

What I claim is:

1. An implement of the character described comprising, a frame, wheels supporting the frame, a crank shaft operable by said wheels, digging units supported on the shaft for effecting a loosening of the soil, and ejecting units operable by said shaft and working within and guided by said digging units for removing rhizomes from the loosened soil.

2. An implement of the character described comprising, a frame, wheels supporting the frame, digging members pivotally supported on the frame and biased to a predetermined position, and ejection members mounted for vertical reciprocating movement, and means operable by said wheels for actuating said ejecting members.

3. An implement of the character described comprising, a frame, wheels supporting the frame, brackets carried by the frame, a crank shaft journaled in the brackets and provided at intervals with cranks, digging members pivotally mounted on said shaft and biased to a predetermined position, ejecting members connected to said cranks and formed with upwardly extending teeth, and means operable by said wheels for actuating said shaft to effect upward and forward movement of said ejecting members.

4. An implement of the character described comprising, a frame, wheels supporting the frame, brackets carried by said frame, a crank shaft journaled in said brackets and provided at intervals with cranks, adjacent cranks being disposed in different planes, digging members pivotally mounted on said crank shaft and biased to a predetermined position, ejecting members connected to said cranks and having upwardly extending teeth formed thereon, means for biasing the ejecting members to a predetermined position, and means operable by said wheels for rotating said crank shaft in a predetermined direction.

5. An implement of the character described comprising, a frame, wheels supporting the frame, a crank shaft carried by the frame and formed at intervals with cranks, digging members pivotally mounted on said crank shaft and including shoes adapted to penetrate the soil, a positioning bar carried by the frame, springs associated with the digging members to bias the same into engagement with said bar, ejecting members connected to said cranks and formed with upwardly extending teeth, means for biasing the ejecting members to a predetermined position, and means operable by said wheels for driving said crank shaft to a predetermined direction.

6. An implement of the character described comprising, a wheel supported frame, a digging member carried by the frame and biased to a predetermined position, an ejecting member movable through the digging member and in advance of the same to effect the removal of rhizomes from the soil, and means for actuating the ejecting member.

7. In an implement of the character described a digging member comprising a frame, parallel extensions formed on one end of the frame, a shoe connecting the free ends of said extensions and an ejecting member comprising a bar movable within the frame and between said extensions, teeth formed on said bar, a spring connected to said bar and to said frame for biasing the former to a predetermined position, and roller bearings carried by the digging member and engageable with the edges of said bar.

WALTER LEVI FOSS.